United States Patent Office 2,828,309
Patented Mar. 25, 1958

2,828,309

ADDUCT OF 4,6-DIMETHYL-2-HYDROXYPYRIMIDINE AND 5-NITRO-2-FURALDEHYDE SEMICARBAZONE

Gabriel Gever, Oxford, N. Y., assignor to The Norwich Pharmacal Company, Norwich, N. Y., a corporation of New York No Drawing. Application April 5, 1956
Serial No. 576,235

1 Claim. (Cl. 260—256.4)

This invention relates to a new chemical composition, formed by the interaction of 4,6-dimethyl-2-hydroxypyrimidine and 5-nitro-2-furaldehyde semicarbazone, which has effective anticoccidial properties.

I have discovered that 4,6-dimethyl-2-hydroxypyrimidine and 5-nitro-2-furaldehyde semicarbazone may be caused to interact to provide a 1:1 molar adduct which may be represented by the following formula:

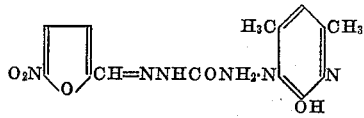

Cecal coccidiosis is a widespread and serious disease of chickens. It has long been one of the most serious hazards in the poultry business. My new adduct provides a potent and valuable drug for combatting that disease. This is illustrated by the results of tests wherein my new adduct was administered to chickens which had been infected experimentally with 500,000 oocysts of *Eimeria tenella*, a causative agent of coccidiosis. The adduct was administered to infected birds in doses of about 15 mg./kg. over a period which lasted less than one week. As a result of such treatment, from 90% to 100% of the birds to which my new adduct had been administered survived the infection. This result is surprising, as attested by the fact that, in a group of similarly infected but unmedicated birds, 80% died.

The administration of my new adduct to chickens is easy. It may merely be mixed with the feed. When it is so administered in effective dosages (about 15 mg./kg.), no toxic manifestations have been observed as a result thereof.

In preparing my new adduct, the method which I now prefer to follow consists in mixing about 4 moles of 4,6 dimethyl-2-hydroxypyrimidine and about 2.5 moles of 5-nitro-2-furaldehyde semicarbazone in methanol and stirring such mixture for about 2 to 16 hours at room temperature. The solid adduct which forms is filtered and dried. In the preparation of my new adduct, other materials which are inert to each reactant may be substituted for the methanol. Examples of such other materials are benzene and dimethylsulfoxide.

In order that my invention may be fully available to those skilled in the art, an illustrative method for the preparation thereof is described briefly:

A mixture of 5 g. of 4,6-dimethyl-2-hydroxypyrimidine, 5 g. of 5-nitro-2-furaldehyde semicarbazone and 25 cc. of methanol is stirred at room temperature for 7 hours. The mixture is filtered and the solid dried to yield 7.9 g. of my new adduct, M. P. 215° C. (dec.). Its $$E_{1cm.}^{1\%} = 486 \text{ at } 3750 \ A$$

What I claim is:

A composition having anticoccidial properties, comprising an adduct, formed by the interaction of 4,6-dimethyl-2-hydroxypyrimidine and 5-nitro-2-furaldehyde semicarbazone, represented by the formula:

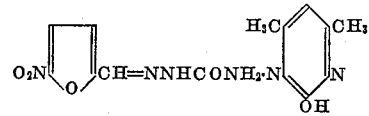

References Cited in the file of this patent

UNITED STATES PATENTS

| | | |
|---|---|---|
| 2,628,183 | Johnson | Feb. 10, 1953 |
| 2,731,382 | Basso | Jan. 17, 1956 |

OTHER REFERENCES

Harwood et al.: Annals of the N. Y. Academy of Sciences, vol. 52, pp. 538–542 (1949).